United States Patent [19]

Cölln et al.

[11] 3,926,998
[45] Dec. 16, 1975

[54] O-ALKYL-O-PYRAZOLOPYRIMIDINE-THIONO-PHOSPHORIC ACID ESTER AMIDES

[75] Inventors: Reimer Cölln, Wuppertal; Ingeborg Hammann, Cologne, both of Germany

[73] Assignee: Bayer Aktiengesellschaft, Leverkusen, Germany

[22] Filed: Oct. 17, 1974

[21] Appl. No.: 515,795

[30] Foreign Application Priority Data
Oct. 23, 1973 Germany............................ 2352995

[52] U.S. Cl........................... 260/256.5 R; 424/200
[51] Int. Cl.²...................................... C07D 239/00
[58] Field of Search ............................. 260/256.5 R

[56] References Cited
UNITED STATES PATENTS

| | | | |
|---|---|---|---|
| 3,402,176 | 9/1968 | Schicke........................ | 260/256.5 X |
| 3,761,679 | 9/1973 | Hoffman et al................. | 260/256.5 |
| 3,808,333 | 4/1974 | Milzner et al................... | 260/256.5 |

*Primary Examiner*—Leonard Schenkman
*Attorney, Agent, or Firm*—Burgess, Dinklage & Sprung

[57] ABSTRACT

O-Alkyl-O-pyrazolopyrimidine-thiono-phosphoric acid ester amides of the formula

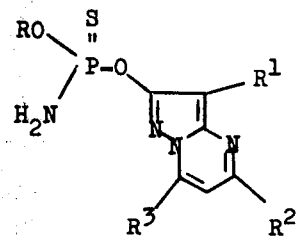

in which
R is an alkyl radical with 1 to 6 carbon atoms,
R¹ is hydrogen or halogen, and
R² and R³ each independently is hydrogen or methyl,
which possess insecticidal and acaricidal properties.

7 Claims, No Drawings

O-ALKYL-O-PYRAZOLOPYRIMIDINE-THIONO-PHOSPHORIC ACID ESTER AMIDES

The present invention relates to and has for its objects the provision of particular new O-alkyl-O-pyrazolopyrimidine-thiono-phosphoric acid ester amides which possess insecticidal or acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specification No. 2,131,298 that O-pyrazolopyrimidine-thiono-phosphoric acid ester-amides, for example O-ethyl-N,N-dimethyl-O-[pyrazolo-(1,5-α)-pyrimidin-(2)yl]-(Compound A) or -O-[3-chloropyrazolo-(1,5-α)-pyrimidin-(2)yl]-thiono-phosphoric acid ester (Compound B) exhibit a pesticidal, in particular an insecticidal and acaricidal, action.

The present invention provides O-pyrazolopyrimidine-thiono-phosphoric acid ester-amides of the general formula

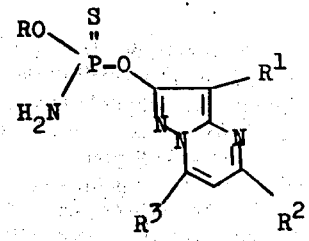
(I)

in which
R is an alkyl radical with 1 to 6 carbon atoms,
R¹ is hydrogen or halogen, and
R² and R³ each independently is hydrogen or methyl.

Preferably R is a straight or branched lower alkyl radical with 1 to 4 carbon atoms, and R¹ is hydrogen, chlorine or bromine.

Surprisingly, the O-pyrazolopyrimidine-thiono-phosphoric acid ester-amides according to the invention possess a better insecticidal and acaricidal action, coupled with very low toxicity to warm-blooded animals, than the corresponding previously known compounds of analogous structure and of the same type of action. The products according to the present invention thus represent an enrichment of the art.

The invention also provides a process for the preparation of an O-pyrazolopyrimidine-thiono-phosphoric acid ester-amide of the formula (I) in which an O-alkylthiono-phosphoric acid ester dihalide of the general formula

(II)

is reacted with a 2-hydroxypyrazolopyrimidine derivative of the general formula

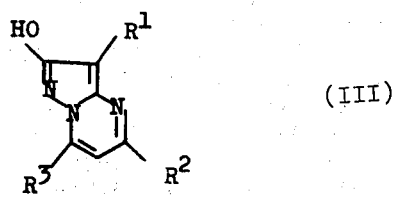
(III)

in which formulae
R, R¹, R² and R³ have the above-mentioned meanings and
Hal is a halogen atom, preferably a chlorine atom, in the presence of an acid acceptor or in the form of an alkali metal salt, alkaline earth metal salt or ammonium salt, and the O-alkyl-O-pyrazolopyrimidine-thiono-phosphoric acid diester halide thus obtained is reacted with ammonia in the presence of an acid acceptor.

The O-alkyl-O-pyrazolopyrimidine-thiono-phosphoric acid diester halide derivative obtained in the first stage of the process need not be isolated before being reacted with ammonia.

If, for example, O-ethyl-thiono-phosphoric acid ester dichloride, 2-hydroxy-pyrazolo-(1,5-α)-pyrimidine and ammonia are used as starting compounds, the course of the reactions according to the invention can be represented by the following formula scheme:

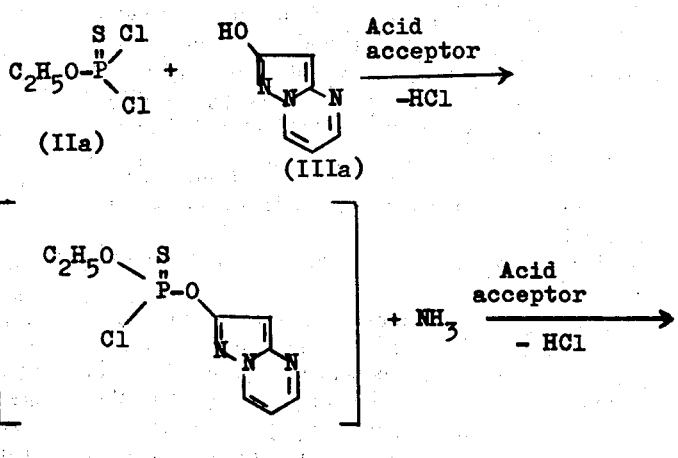

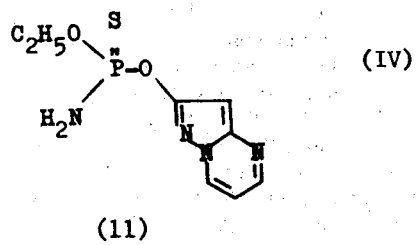

(IV)

(11)

The O-alkyl-thiono-phosphoric acid ester dihalide (II) to be used as starting compounds are known and can be prepared in accordance with known processes, for example according to U.S. Pat. Specification No. 3,005,005. The 2-hydroxypyrazolo-(1,5-α)-pyrimidine derivatives (III) are also known and can be prepared by known processes such as described in German Published Specification NO. 2,131,298, Belgian Patent Specification No. 769,702 and Annalen 647 (1961) pages 117–144.

The following are individual examples of O-alkylthiono-phosphoric acid ester dihalides (II): O-methyl-, O-ethyl-, O-n-propyl-, O-iso-propyl, O-n-butyl-, O-sec.-butyl-, O-iso-butyl- and O-tert.-butyl-thionophosphoric acid ester dichloride or dibromide.

The following are individual examples of the pyrazolopyrimidine derivatives (III): 2-hydroxy-pyrazolo-(1,5-α)-pyrimidine and 2-hydroxy-3-chloro- and -3-bromo-, -3-chloro-7-methyl-, -3-bromo-7-methyl-, -3-chloro-5,7-dimethyl-, -3-bromo-5,7-dimethyl-, -5,7-dimethyl-, and -7-methyl-pyrazolo-(1,5-α)-pyrimidine.

The reaction according to the invention for the preparation of the new compounds (I) is preferably carried out in the presence of a solvent, which term includes a mere diluent. Practically all inert organic solvents can be used for this purpose; preferred solvents including aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, such as acetone, methyl ethyl ketone, methyl isopropyl ketone and methyl isobutyl ketone; and in particular nitriles, such as acetonitrile and propionitrile.

All customary acid-binding agents can be used as acid acceptors. Alkali metal carbonates and alkali metal alcoholates, such as sodium carbonate and potassium carbonate, sodium methylate and potassium methylate and sodium ethylate and potassium ethylate, have proved particularly successful, as have aliphatic, aromatic or heterocyclic amines, for example triethylamine, trimethylamine, dimethylaniline, dimethylbenzylamine and pyridine.

The reaction temperature can be varied within a wide range. In general, the reaction is carried out at 0 to 100, preferably at 0° to 25°C.

In general, the reaction is carried out under normal pressure.

In carrying out the process, the O-alkylthionophosphoric acid ester dihalide and the 2-hydroxypyrazolopyrimidine component may be employed in equimolar ratios, while the ammonia is preferably added in 10% excess, in the form of a concentrated aqueous solution. The reaction is preferably carried out in the presence of one of the abovementioned solvents and in the presence of an acid acceptor, at the indicated temperatures. The reaction mixture may be stirred further and between one and several hours and may then be mixed with water, and the crystals may be filtered off and purified in the usual manner, for example by washing, drying and/or recrystallization.

The compounds according to the invention are obtained in crystalline form. They are characterized by their melting points.

As has already been mentioned, the new -O-pyrazolopyrimidine-thiono-phosphoric acid ester-amides are distinguished by an outstanding insecticidal and acaricidal activity coupled with only slight toxicity towards warm-blooded animals. They possess a good action against both sucking and biting insects and mites (Acarina).

For these reasons, the products according to the invention may be employed successfully as pesticides in plant protection and the protection of stored products, and in the hygiene field.

To the sucking insects there belong, in the main, aphids (Aphididae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the currant gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus.

In the case of the biting insects, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella).

Also to be classed with the biting insects are beetles (Coleoptera), for example the granary weevil (Sito-

*philus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium casteneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern substerranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus* = *Panonychus ulmi*), gall mites, for example the blackcurrant gall mite (*Eriophyes ribis*) and tarsonemids, for exampple the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvent may be added as auxiliary solvent. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. pertroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, e.g. to a growing crop, to an area where a crop is to be grown or to a domestic animal, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage: 100% means that all the caterpillars were killed whereas 0% means that none of the caterpillars were killed.

The active compounds, the concentrations of the active compounds, the evaluation times and the results can be seen from the following Table 1:

Table 1

(Insects which damage plants)

Plutella test

| Active compounds | Active compound concentration in % | Degree of destruction in % after 3 days |
|---|---|---|
| (A) (known) | 0.1 / 0.01 | 75 / 0 |
| (B) (known) | 0.1 / 0.01 | 100 / 0 |
| (11) | 0.1 / 0.01 | 100 / 100 |
| (12) | 0.1 / 0.01 | 100 / 100 |
| (8) | 0.1 / 0.01 | 100 / 100 |
| (3) | 0.1 / 0.01 / 0.001 | 100 / 100 / 95 |
| (1) | 0.1 / 0.01 | 100 / 100 |
| (4) | 0.1 / 0.01 | 100 / 100 |
| (2) | 0.1 / 0.01 | 100 / 90 |

Table 1 (continued)

| Active compounds | Active compound concentration in % | Degree of destruction in % after 3 days |
|---|---|---|
| (7) $C_2H_5O$-P(S)(NH_2)-O-[pyrazolopyrimidine with CH_3, CH_3] | 0.1 / 0.01 | 100 / 100 |
| (10) $n\text{-}C_3H_7O$-P(S)(NH_2)-O-[pyrazolopyrimidine with CH_3, CH_3] | 0.1 / 0.01 | 100 / 95 |
| (6) $C_2H_5O$-P(S)(NH_2)-O-[pyrazolopyrimidine with Cl, CH_3, CH_3] | 0.1 / 0.01 | 100 / 90 |

EXAMPLE 2

Myzus test (contact action)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (Brassica oleracea) which had been heavily infested with peach aphids (Myzus persicae) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 2:

Table 2
(Insects which damage plants)
Myzus test

| Active compounds | Active compound concentration in % | Degree of destruction in % after 1 day |
|---|---|---|
| (known) (B) $C_2H_5O$-P(S)(N(CH_3)_2)-O-[pyrazolopyrimidine with Cl] | 0.1 / 0.01 | 40 / 0 |
| (11) $C_2H_5O$-P(S)(NH_2)-O-[pyrazolopyrimidine] | 0.1 / 0.01 / 0.001 | 100 / 100 / 90 |

Table 2 (continued)

| Active compounds | Active compound concentration in % | Degree of destruction in % after 1 day |
|---|---|---|
| (12) $n\text{-}C_3H_7O$-P(S)(NH_2)-O-[pyrazolopyrimidine] | 0.1 / 0.01 / 0.001 | 100 / 100 / 75 |
| (8) $CH_3O$-P(S)(NH_2)-O-[pyrazolopyrimidine with CH_3] | 0.1 / 0.01 | 100 / 100 |
| (3) $C_2H_5O$-P(S)(NH_2)-O-[pyrazolopyrimidine with CH_3] | 0.1 / 0.01 | 100 / 85 |
| (1) $n\text{-}C_3H_7O$-P(S)(NH_2)-O-[pyrazolopyrimidine with CH_3] | 0.1 / 0.01 | 100 / 100 |
| (9) $CH_3O$-P(S)(NH_2)-O-[pyrazolopyrimidine with CH_3, CH_3] | 0.1 / 0.01 | 100 / 100 |

EXAMPLE 3

Tetranychus test (resistant)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (Phaseolus vulgaris), which had a height of approximately 10 – 30 cm, were sprayed with the preparation of the active compound until dripping wet. These bean plants were heavily infested with the common or twospotted spider mite (Tetranychus urticae) in all stages of development.

After the specified periods of time, the effectiveness of the preparation of active compound was determined by counting the dead mites. The degree of destruction thus obtained was expressed as a percentage: 100% means that all th spider mites were killed whereas 0% means that none of the spider mites were killed.

The active compounds, the concentrations of the active compounds, the evaluation times and the results can be seen from the following Table 3:

Table 3

(Mites which damage plants)

Tetranychus test (resistant)

| Active compounds | Active compound concentration in % | Degree of destruction in % after 2 days |
|---|---|---|
| (A) (known) C₂H₅O-P(S)(N(CH₃)₂)-O-[pyrazolopyrimidine] | 0.1 | 0 |
| (B) (known) C₂H₅O-P(S)(N(CH₃)₂)-O-[Cl-pyrazolopyrimidine] | 0.1 | 0 |
| (11) C₂H₅O-P(S)(NH₂)-O-[pyrazolopyrimidine] | 0.1 / 0.01 | 100 / 100 |
| (12) n-C₃H₇O-P(S)(NH₂)-O-[pyrazolopyrimidine] | 0.1 / 0.01 | 98 / 60 |

Example 4

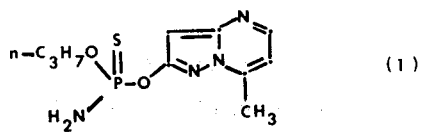

(1)

A solution of 110.4 g (0.8 mole) of potassium carbonate in 180 g of water was added dropwise to a mixture of 59.5 g (0.4 mole) of 2-hydroxy-7-methyl-pyrazolo-(1,5-α)-pyrimidine, 320 g of acetone and 77.2 g (0.4 mole) of 0-n-propyl-thiono-phosphoric acid ester dichloride while stirring and cooling at 0° to 5°C. The reaction mixture was stirred for a further two hours in an ice water bath. 0.44 Mole of ammonia in the form of a concentrated aqueous solution was then added dropwise, while keeping the internal temperature at 20°C by means of external cooling. After further brief stirring at 20°C, the reaction mixture was mixed with 1.2 liters of cold water and the crystals were filtered off, washed with water and dried in a vacuum desiccator. Recrystallization of the dried product from a two-fold amount of toluene gave 68.7 g (60% of theory) of 0-n-propyl-0-[7-methyl-pyrazolo-(1,5-α)-pyrimidin(2)-yl]-thionophosphoric acid ester-amide in the form of pale yellowish crystals of melting point 129° to 130°C.

The compounds listed below were prepared analogously:

| Structure | Physical data (melting point °C) |
|---|---|
| 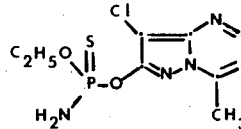 (2) | 118–120 |
| 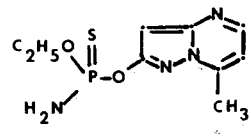 (3) | 154–155 |
| 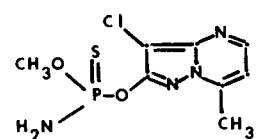 (4) | 156–158 |
| 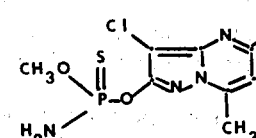 (5) | 167–168 |
| 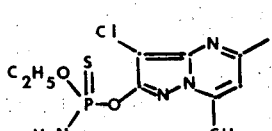 (6) | 162–163 |
| 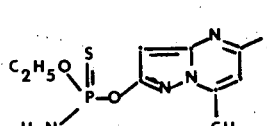 (7) | 183–184 |
| 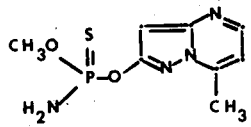 (8) | 165–166 |
| 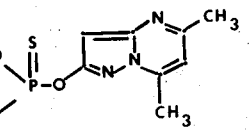 (9) | 140–141 |
| 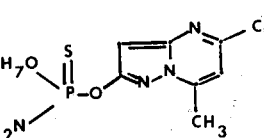 (10) | 164–165 |

-continued

| Structure | Physical data (melting point, °C) |
|---|---|
| 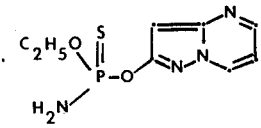 (11) | 140–142 |
| 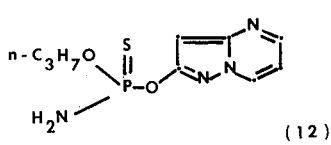 (12) | 122–123 |

Other compounds which can be similarly prepared include:
0-isopropyl-0-[3-bromo-5-methyl-,
0-n-butyl-0-[3-chloro-5,7-dimethyl-, and
0-tert.butyl-0-[5-methyl-pyrazolo-(1,5-α)-pyrimidin(2)-yl]-thionophosphoric acid ester-amides.

It will be appreciated that the instant specification and examples are set forth by way of illustration and not limitation, and that various modifications and changes may be made without departing from the spirit and scope of the present invention.

What is claimed is:

1. An 0-alkyl-0-pyrazolopyrimidine-thionophosphoric acid ester-amide of the formula

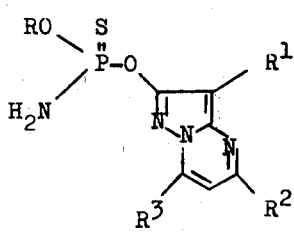

in which
R is alkyl with 1 to 6 carbon atoms,
R¹ is hydrogen or halogen, and
R² and R³ each independently is hydrogen or methyl.

2. A compound according to claim 1 in which R is alkyl with 1 – 4 carbon atoms and R¹ is hydrogen, chlorine or bromine.

3. A compound according to claim 1 which is 0-n-propyl-0-[7-methyl-pyrazolo-(1,5-α)-pyrimidin(2)-yl]-thionophosphoric acid ester-amide of the formula

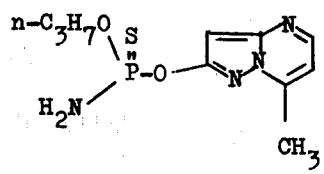

4. A compound according to claim 1 which is 0-ethyl-0-[7-methyl-pyrazolo-(1,5-α)-pyrimidin(2)-yl]-thionophosphoric acid ester-amide of the formula

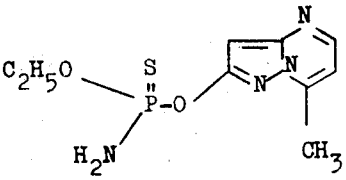

5. A compound according to claim 1 which is 0-methyl-0-[5,7-dimethyl-pyrazolo-(1,5-α)-pyrimidin(2)-yl]-thionophosphoric acid ester-amide of the formula 6. A compound according to claim 1 which is 0-ethyl-0-[pyrazolo-(1,5-α)-pyrimidin(2)-yl]-thionophosphoric acid ester-amide of the formula

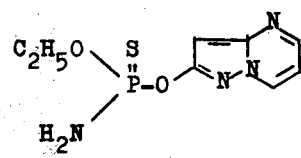

7. A compound according to claim 1 which is 0-n-propyl-0-[pyrazolo-(1,5-α)-pyrimidin-(2)-yl]-thionophosphoric acid ester-amide of the formula

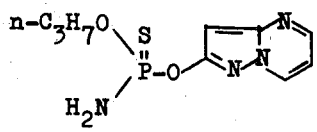

* * * * *